(12) United States Patent
Wilson

(10) Patent No.: US 11,501,058 B2
(45) Date of Patent: *Nov. 15, 2022

(54) EVENT DETECTION BASED ON TEXT STREAMS

(71) Applicant: MICROSOFT TECHNOLOGY LICENSING, LLC, Redmond, WA (US)

(72) Inventor: Alexander James Wilson, Dublin (IE)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 64 days.

This patent is subject to a terminal disclaimer.

(21) Appl. No.: 17/096,866

(22) Filed: Nov. 12, 2020

(65) Prior Publication Data

US 2021/0064813 A1 Mar. 4, 2021

Related U.S. Application Data

(63) Continuation of application No. 16/108,660, filed on Aug. 22, 2018, now Pat. No. 10,860,781.

(60) Provisional application No. 62/688,239, filed on Jun. 21, 2018.

(51) Int. Cl.
*G06F 16/00* (2019.01)
*G06F 40/149* (2020.01)
*G06F 16/31* (2019.01)
*G06F 16/335* (2019.01)
*G06F 16/35* (2019.01)

(52) U.S. Cl.
CPC .......... *G06F 40/149* (2020.01); *G06F 16/313* (2019.01); *G06F 16/335* (2019.01); *G06F 16/355* (2019.01)

(58) Field of Classification Search
None
See application file for complete search history.

(56) References Cited

U.S. PATENT DOCUMENTS

2010/0138377 A1* 6/2010 Wright .............. G06F 16/24568
706/52
2018/0157644 A1* 6/2018 Mandt .................. G06N 3/0454

* cited by examiner

*Primary Examiner* — Anhtai V Tran
(74) *Attorney, Agent, or Firm* — Newport IP, LLC; Han K. Gim

(57) ABSTRACT

A text stream source is accessed that includes a plurality of text content items. Unique word groupings are determined for the plurality of text content items. A burst detection algorithm is executed to determine word groupings that are currently bursting and that started within a specified time period. Based on the word groupings, an issue is determined based on identifying a set of texts forming at least one clique.

20 Claims, 12 Drawing Sheets

EVENT DETECTION BASED ON TEXT STREAMS

CROSS-REFERENCE TO RELATED APPLICATIONS

This patent application claims the benefit of U.S. patent application Ser. No. 16/108,660, filed Aug. 22, 2018, entitled "EVENT DETECTION BASED ON TEXT STREAMS," which claims the benefit of U.S. Provisional Application Ser. No. 62/688,239, filed Jun. 21, 2018, entitled "EVENT DETECTION BASED ON TEXT STREAMS," the entirety of which are both hereby incorporated by reference.

BACKGROUND

Computing devices today are increasingly interconnected via various networks such as the Internet, thus allowing users of the devices to share information regarding issues and problems with various devices and applications. For example, users may post inquiries about issues that they are experiencing on user forums and community boards. Users may also send feedback to support services for the various devices and applications. Additionally, potential issues may be written up in articles and other written sources such as blogs. As the number of computing devices increase and the number of applications grow, tracking this feedback from users and identifying issues are becoming increasingly difficult.

It is with respect to these and other considerations that the disclosure made herein is presented.

SUMMARY

In various embodiments disclosed herein, methods and systems for event detection through the automatic processing of text streams is described. In one embodiment, text streams from various sources are accessed or received. For example, online sources such as a message stream or a stream of news articles may be analyzed. The technique may include analyzing the text stream and searching for trends or events within the volume of text data. The volume of text data that is available from online sources may be voluminous and manual analysis by humans will be difficult or impossible. For example, Twitter streams may have a tweet rate of up to 5,700 tweets per second, resulting in a large volume of text that is difficult to analyze using manual methods. However, a wealth of information may be obtained from text stream sources. For example, a more automated system that can analyze the text stream sources may be able to detect events and provide the detected events to various users such as support organizations, news organizations, and the like.

It may be advantageous for support organizations for various services such as computing, storage, and other services to analyze text stream sources to identify issues that may be reflected in the text streams. For example, text stream sources may be analyzed to determine if users across a given demographic are discussing a potential issue for a computing application that has not yet been identified by the support organization for the computing application. The support organization may receive feedback text streams that may contain important information. For example, a computing application may receive many thousands of feedback comments depending on the user base for the product. Such feedback comments may include feature requests, positive comments, and suggestions. However, the comments may also address issues with the computing application that may identify a potential problem with the product. For example, issues may arise as a result of product updates, server issues, bugs in code, etc. It would be advantageous to be able to detect these issues automatically as quickly and reliably as possible.

Some embodiments may be implemented that address potential shortcomings of systems such as those based on "Ring: Real-Time Emerging Anomaly Monitoring System over Text Streams" (*IEEE Transactions on Big Data*, 23 Feb. 2017). Such systems may not be able to detect events where the text stream sources may comprise a smaller volume of content. Such systems may also not be able to differentiate between different events that have happened within a similar time frame. Furthermore, such systems may use a fixed monitoring period over which the system searches for issues, for example 30 minutes. Such a monitoring period may be unsuitable, in particular where events of interest may manifest in text stream sources as events with smaller signatures and over longer periods of time (e.g., 2 days or more).

The ability to quickly and reliably identify issues from text stream sources may be a valuable resource for service and product providers. In various embodiments disclosed herein, text stream sources may be analyzed to identify events indicative of new or emerging issues with products and services. Issues may arise as a result of product updates, server issues, bugs in code, etc., and the techniques described herein may be used to analyze text stream sources, including large volumes of feedback, to detect such issues automatically in a quick and reliable manner.

In some embodiments, text stream sources may be analyzed using a dynamic monitoring period. Events may be identified over different periods of time rather than a fixed time period. Some embodiments may further employ constrained-graph creation techniques to differentiate events that occur within a similar time period. Furthermore, community burst detection may be implemented that aggregates text streams related to an issue and performs burst detection on the aggregated text streams.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1A:
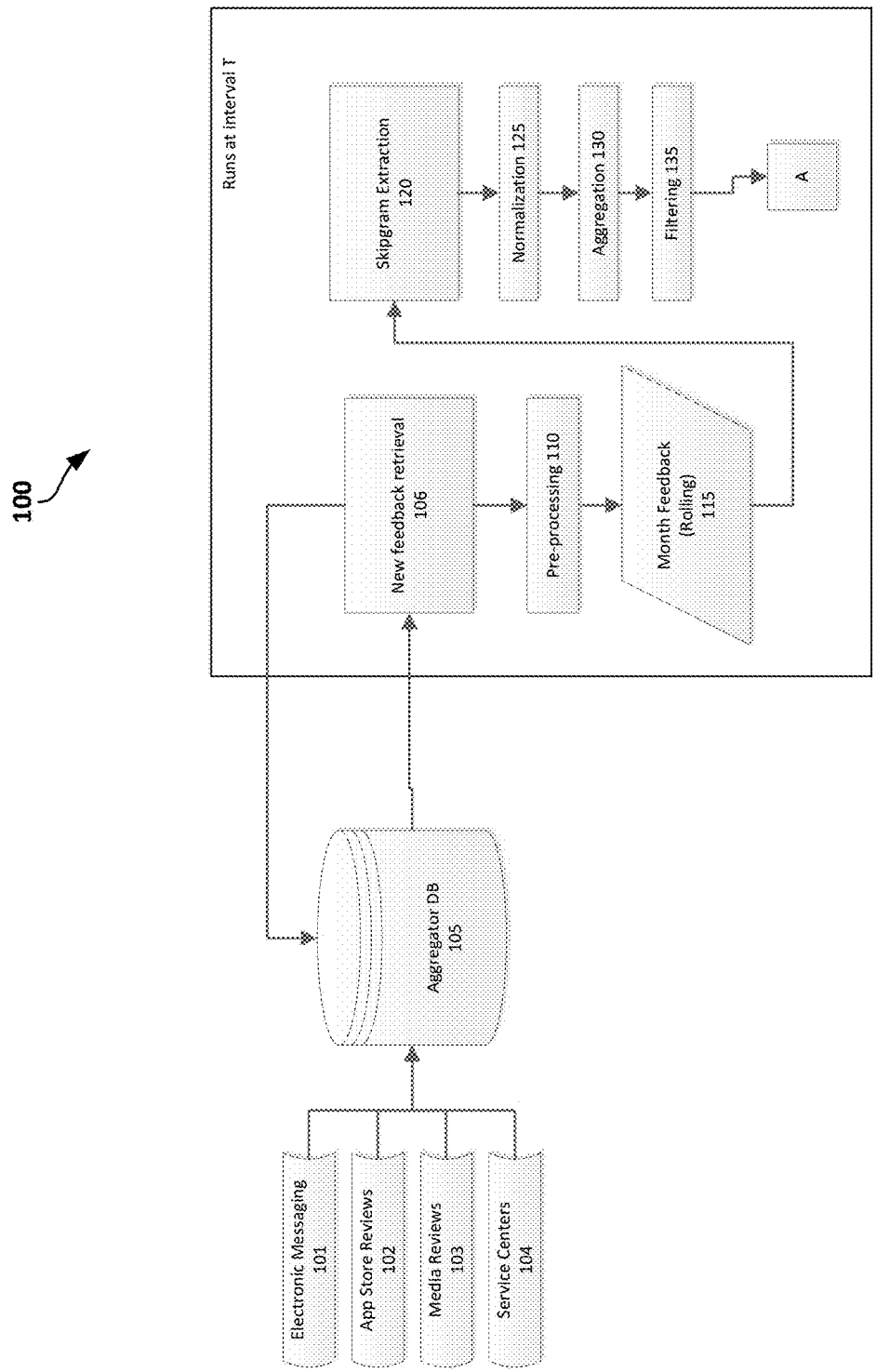
FIG. 1A is a flowchart depicting an example procedure for analyzing text streams in accordance with the present disclosure.

Event detection systems can be one of two types of systems: retrospective and online. Retrospective systems assume that there is a retrospective view of the data in its entirety and entails the discovery of previously unidentified events in an accumulated collection. Online detection strives to identify the onset of new events from live text streams in real-time. Real-time detection is similar to online detection. The difference is that in real-time detection, time of detection is important, and thus a fixed time window for detection may not be assumed.

While some systems may detect events in real-time, such systems typically require pre-defined keywords for a given topic, making it inapplicable for general bursty topic detection where no prior knowledge of the topic keywords is available. Some systems may aggregate keywords into larger topics but wait until the end-of-day or a fixed time period. Furthermore, the number of topics must be defined in advance, which is undesirable because it is typically not known how many separate issues are occurring at any given time.

Various systems and methods are disclosed that allow for timely and reliable identification of issues from text stream sources. In various embodiments disclosed herein, text stream sources may be analyzed to identify events indicative of new or emerging issues, such as with products and services. In some embodiments, the disclosed systems and methods allow for identification of large events (e.g., an email server going down) that may result in an extremely high volume of text streams in a short time, while also being able to detect smaller events (e.g., a font issue) that may result in a smaller increase in volume of associated text streams. The disclosed systems and methods may thus allow for detection of large events very quickly (e.g., less than 30 minutes) while also allowing for the detection of smaller events. In some embodiments, detection of smaller events may be performed by identifying a small but sustained increase in the rate of feedback (e.g., 2 days). This may allow for a reduction of the Time to Detect (TTD) and thus allow service and product providers to more quickly and more reliably identify and mitigate issues, allowing for more efficient operation of applications and increased customer satisfaction.

Additionally, the ability to identify and differentiate between events may allow for the separate recognition of each issue and their resolution. If issues are not identified separately, they may be merged and one or all issues may go undetected, resulting in delays in resolving each issue.

Feedback aggregation across the detected community graphs allows for event detection to be performed across a range of vocabulary that represents an issue. For example, text phrases such as "can't open my emails today" and "outlook won't open today" may be treated as the same issue and thus both phrases may contribute to the same detection threshold criteria. This may facilitate increased detection sensitivity and reduce detection time.

Figure 1B:
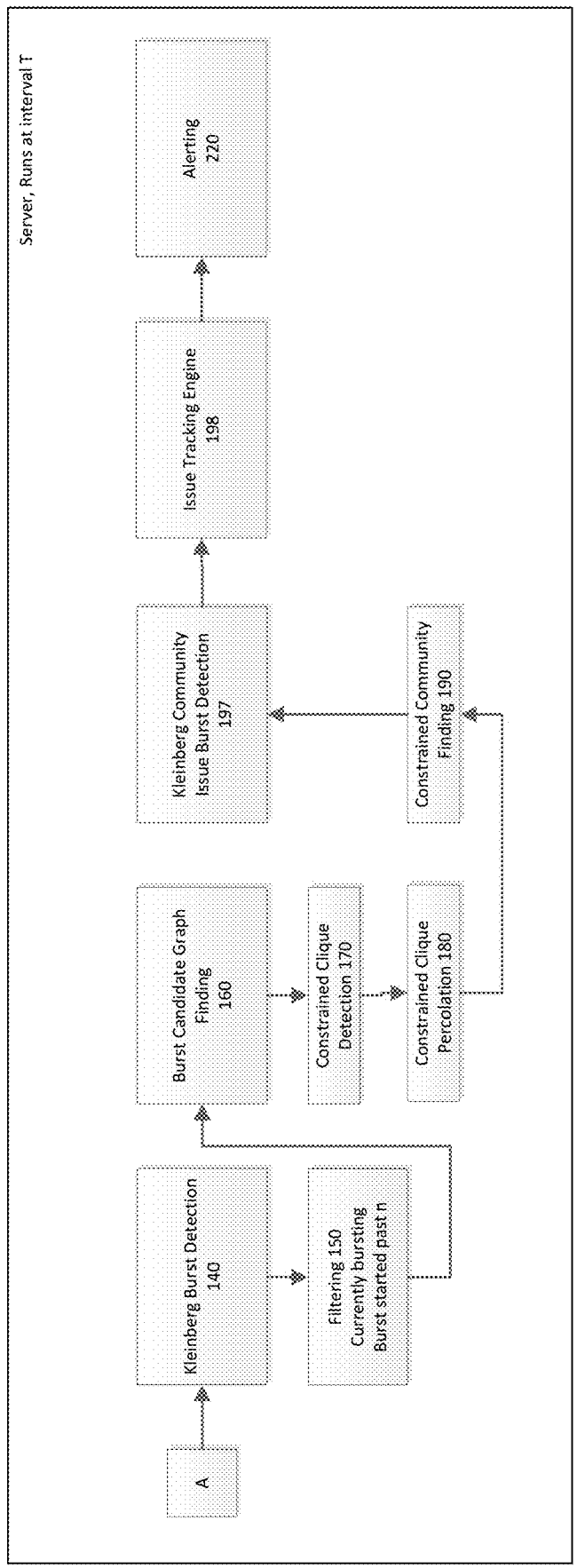
FIG. 1B is a flowchart depicting an example procedure for analyzing text streams in accordance with the present disclosure.

Referring to FIGS. 1A and 1B, illustrated is an example procedure 100 for detecting events based on analysis of a text stream. In an embodiment, the procedure can be implemented at least in part on a system or function corresponding to FIG. 4. An aggregator database 105 may store aggregated data streams from various sources such as electronic messaging sources 101, application platforms that may host app store reviews 102, media platforms that may host media reviews 103, data streams from various service centers 104, and the like. A function to access and retrieve new feedback 106 from the aggregator database 105 may be implemented. The new feedback 106 may include a plurality of text entries. Operation 110 illustrates performing text pre-processing across the text entries to clean and tokenize the text. For example, pre-processing can include stop-word removal, lower-casing, and lemmatization. In some embodiments, text entries may be collected and processed for a rolling period of time such as a one month rolling feedback period 115.

Operation 120 illustrates, for each piece of received text, determining its unique k-skip-n-grams (where k can be defined and n=2, for example). For example, for the input text stream "my outlook program is not working," the n-grams are (my outlook), (my program), (my is), (my not), (my working)|(outlook program), (outlook is), (outlook not), (outlook working)| etc. . . . . . To illustrate another example, the text phrase "the outlook app is a bad program, won't load," the n-grams are (the outlook), (the app), (the is), (the a), (the bad), (the program), (the won't), (the load)|(outlook app), (outlook is), (outlook a), (outlook bad), (outlook program)| etc. . . . . .

In some embodiments, a normalization process 125 may be performed. Operation 130 illustrates aggregating the k-skip-n-grams across the entire set of feedback. In one embodiment, the set may be sorted in alphabetical order such that "outlook program"="program outlook." For example, the k-skip-n-gram "outlook program" may be aggregated according to dates and times, e.g., (Jan. 1, 2017, Feb. 4, 2017, 11:58:29, Mar. 4, 2017, May 4, 2017, Aug. 4, 2017), IDs=(21201, 20201, 29305, 20394, 29395). In some embodiments, a filtering operation 135 may be performed.

Operation 140 illustrates, across all unique k-skip-n-grams, applying a finite-state or infinite-state automaton for detecting bursts. One example is Kleinberg's Burst Detection Algorithm. A burst detection algorithm may identify time periods during which an event of interest is uncharacteristically frequent, or "bursty." The algorithm may be applied over the times at which the feedback has occurred to find the Burst Level (BL), Burst Start Time (BST) and the Burst End Time (BET) of each k-skip-n-gram.

Operation 150 illustrates finding the set of all k-skip-n-grams that are currently bursting (BET=Current Time, BL>=1) and that started within the past n days (BST>CurrDate−n days). In one implementation, this set may be named BurstySkipgrams. n may be a parameter that can be tuned to disregard skipgrams that are likely irrelevant/noise because of the length of time required to become "bursty."

Operation 160 illustrates, from the set of BurstySkipgrams, generating a graph where pairs of vertices connected by an edge represents one of the skipgrams, and thus the vertices are words.

Operation 170 illustrates performing constrained z-clique finding across the graph where z is a tuneable parameter. In one implementation, z=3. Cliques, or subsets or subgraphs of vertices that are adjacent to each other, may be eliminated where the edges have a range of BST more than x amount of time to obtain the set of cliques S1. In one implementation, x is tuneable, which in some embodiments may be automatically determined.

Operation 180 illustrates, using S1, performing constrained clique percolation where two z-cliques are considered adjacent if they share z−1 nodes AND the range of the BST of the combined set of edges is less than p amount of time to obtain the set of constrained clique communities S2. In one implementation, p is tuneable, which in some embodiments may be automatically determined.

Operation 190 illustrates, for each community in the set of S2, finding the set of all texts (e.g., items of feedback) that have at least all the words in at least one clique of the community. The result is the set of related feedback for that clique. This operation may be performed across all cliques in the community to find the set of all community feedback. This set of community feedback may be referred to as S3.

Operation 197 illustrates, for each set of community feedback in S3, applying a finite-state or infinite-state automaton such as Kleinberg's Burst Detection Algorithm over the times at which the feedback has occurred. The BL, BST and BET of each community may be determined. In one embodiment, a different set of parameters for the burst detection algorithm such as S, Lambda, Lambda2 can be employed at this stage than previously used to apply more stringent requirements for community burst detection.

Operation 198 illustrates, for each community that is currently bursting (BET=Current Time, BL>=1), identifying overlapping cliques with bursty communities from the previous iteration. If there is overlap, then the clique is determined to be the same issue. Otherwise, a new issue is identified. In one embodiment, an alert for a new issue may be generated 220.

Figure 1C:
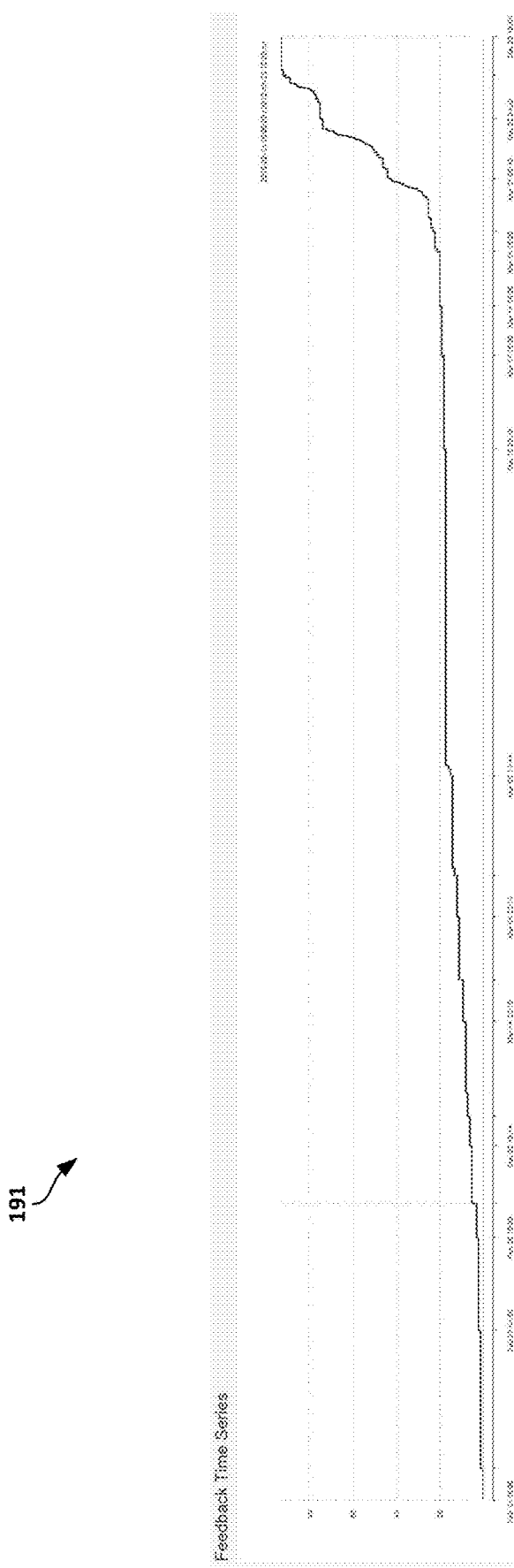
FIG. 1C is a diagram illustrating an example of an issue tracking interface.
Figure 1D:
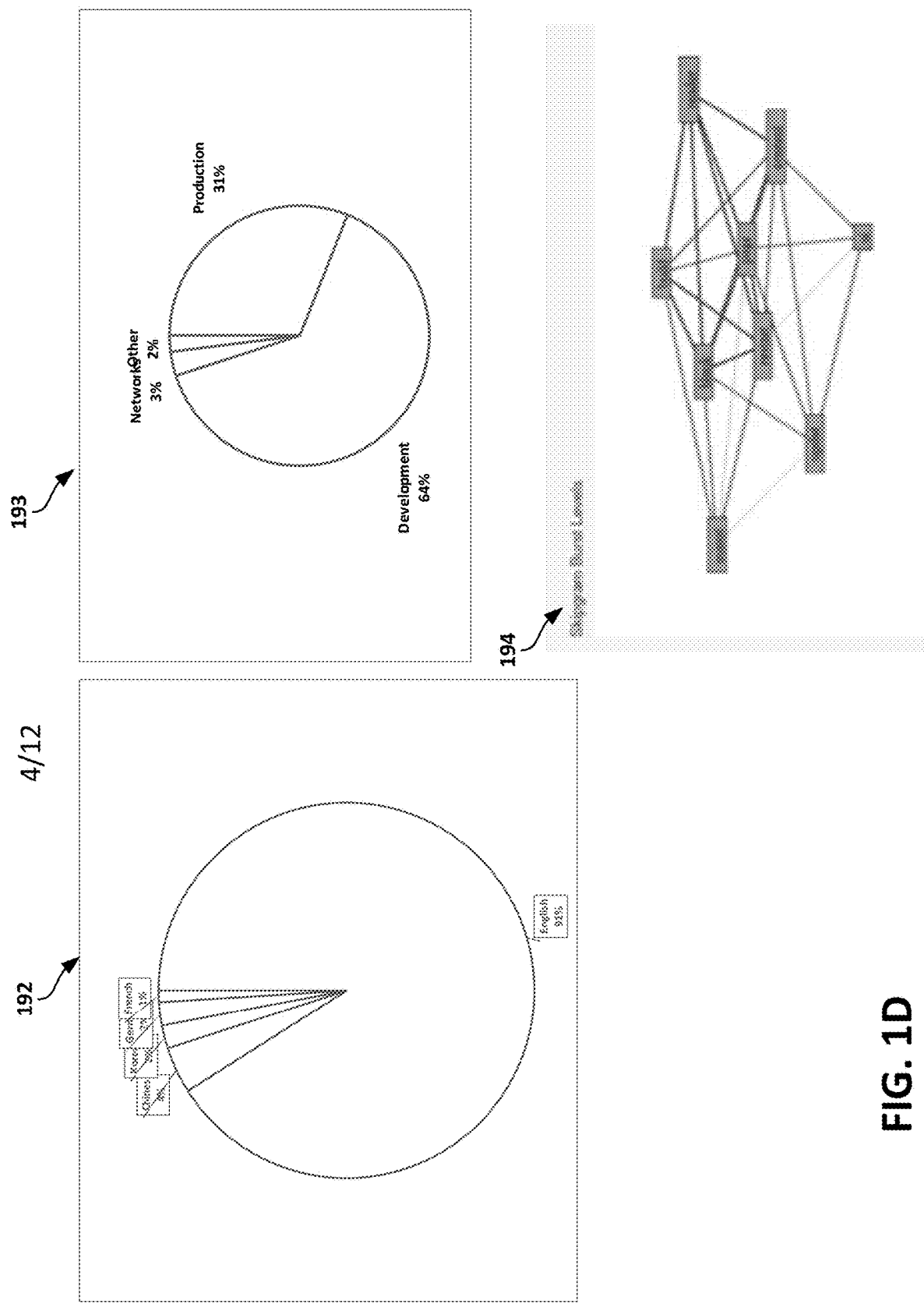
FIG. 1D is a diagram illustrating an example of an issue tracking interface.

In some embodiments, issues may be tracked over time as the issue evolves. This may allow for the determination of whether a fix for the issue is effective. FIG. 1C and FIG. 1D show examples of an issue tracking interface that may be used to allow users to view results of the issue identification techniques described herein. FIG. 1C illustrates an example feedback time series 191 showing numbers of events over time. FIG. 1D illustrates a rendering of a language breakdown 192, audience breakdown 193, and skipgram burst levels 194.

Figure 1E:
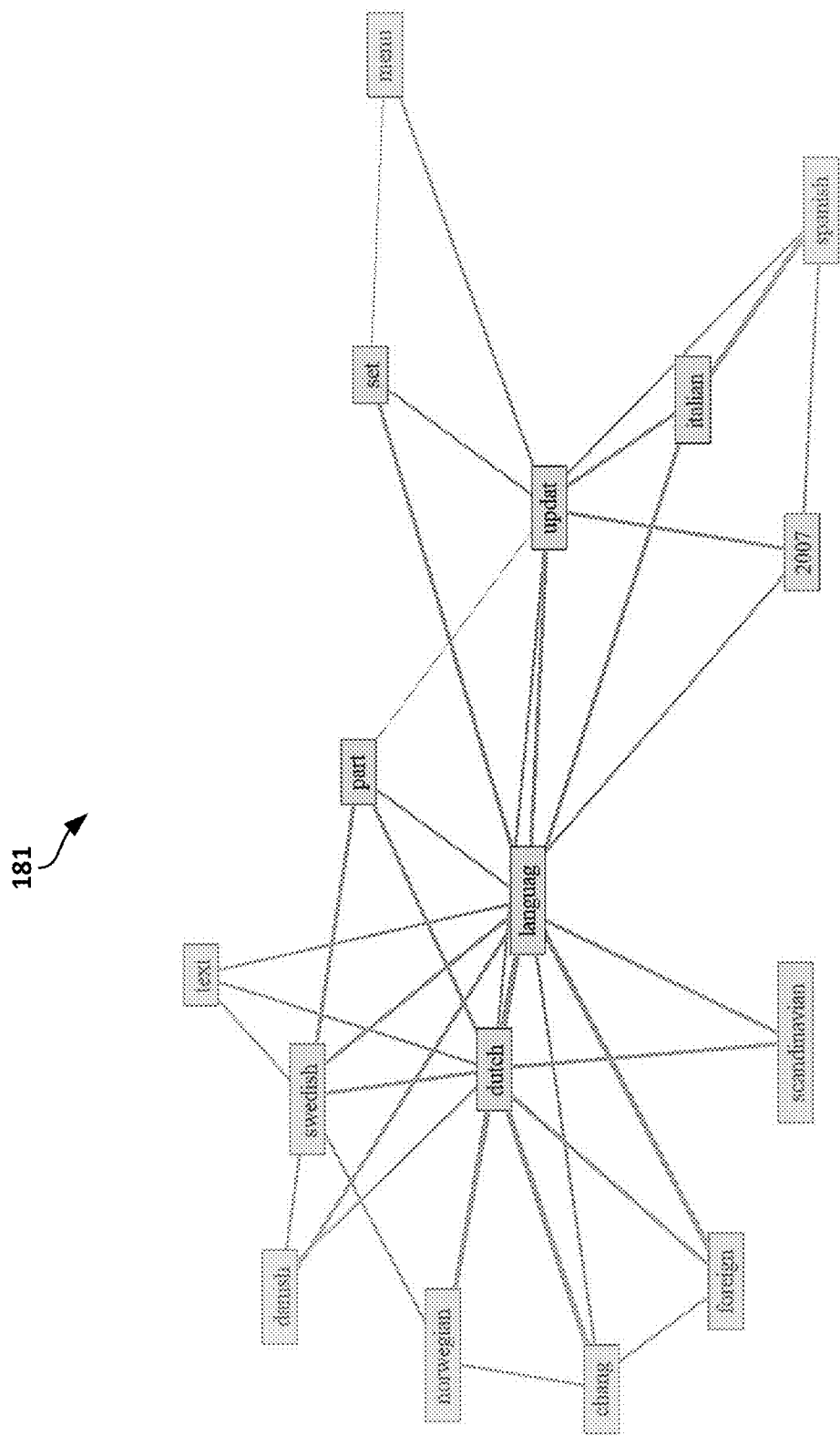
FIG. 1E illustrates an example of a graph with words as vertices in accordance with the present disclosure.

FIG. 1E illustrates an example of a graph 181 with words as vertices in accordance with the present disclosure.

Figure 1F:
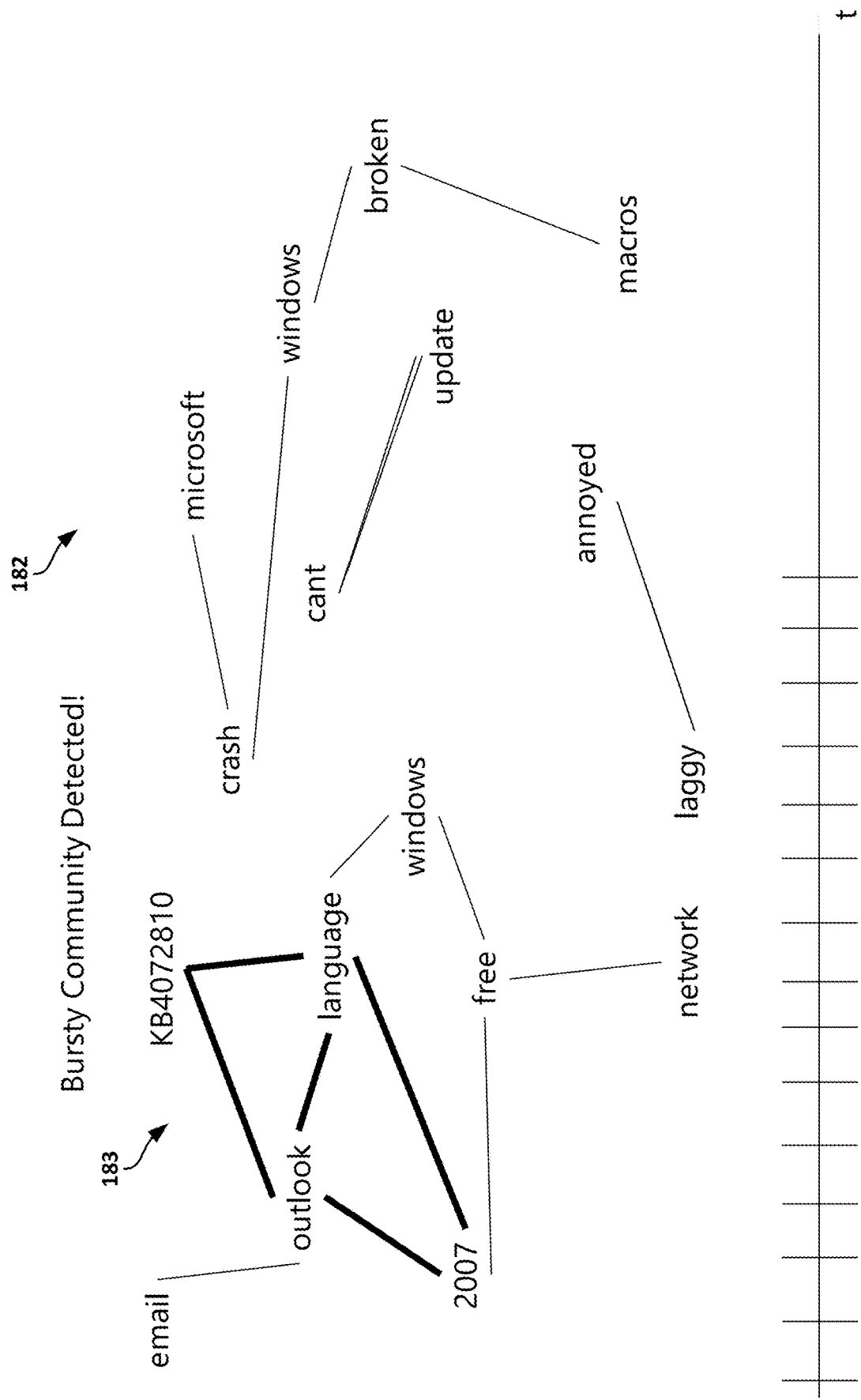
FIG. 1F illustrates an example of detection of bursty community in accordance with the present disclosure.

FIG. 1F illustrates an example of detection of a bursty community 183 in a graph 182, in accordance with the present disclosure.

Figure 1G:
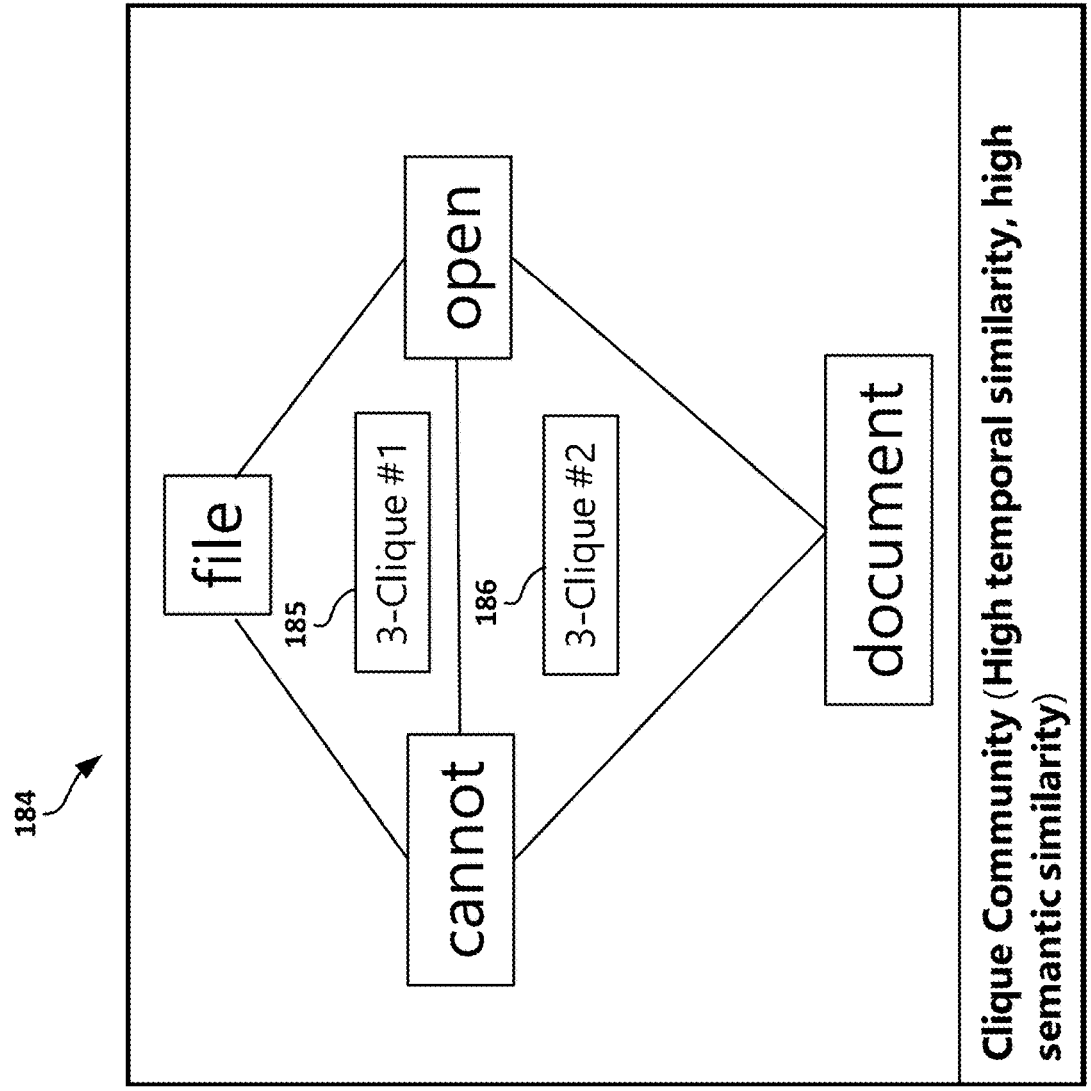
FIG. 1G illustrates an example of detection of a clique community in accordance with the present disclosure.

FIG. 1G illustrates an example of detection of a clique community 184 comprising 3-clique 185 and 3-clique 186, in accordance with the present disclosure.

In some embodiments, the identified issues and the data streams that are associated with each issue may be stored and made available for further analysis and troubleshooting. Additionally and optionally, the captured data may be sent to other devices and systems over a communications network for storage and analysis.

The stored data can be aggregated and analyzed to identify profiles, patterns, and various statistics. For example, analysis of incident rates, health, and performance of a device or an application can be determined. Data mining of identified issues and collected data streams can be useful to identify various characteristics for inferring the current state of a system or application or a group of devices or applications.

It should be noted that while some example implementations are described with reference to computing devices and applications, the described principles can be applied to other types of devices, systems, and scenarios where text stream sources are available and where the text stream sources may be indicative of issues.

Various aspects of the disclosure are described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

By providing a function that analyzes text stream sources and identifies issues as described herein, the need for extensive investigative testing may be reduced or eliminated. Additionally, new or modified features may be more quickly provided in response to identified issues. Furthermore, implementation of analysis at the text stream level can allow for greater accuracy and relevance of the collective information being streamed. For example, if issues are identified after filtering and selection of self-reported feedback, some issues may be completely missed, issues may not be properly prioritized, related issues may not be identified, or issues may be improperly identified as being separate when they are really the same issue. By collecting the raw text stream sources and comprehensively analyzing the data, more accurate issue spotting may be provided while reducing investigative cost.

After characterizing or classifying the issues, a text stream analytic engine may provide reports or generate status and error warnings. The reports and status information may allow analysts to modify designs, improve functionality, and improve device and application maintenance. Alerts may also be provided to the users to inform the user of issues as well as providing recommendations for mitigation actions.

Text stream sources that relate to erroneous behavior is one type of data that may be collected and used for analysis and issue spotting. Other text stream sources may also be used that may be analyzed to identify some indication of quality. The types of information and alerts that may be provided by the analysis engine can vary, such as reports, alerts, and other user information.

Typically, the text stream sources may be collected from multiple devices and can be sent over a network, if available, to a collection service that may execute on a server, which may be housed in a data center. An entity such as a device manufacturer or service provider may collect and aggregate the text stream before and after analysis. The entity can monitor quality of multiple devices and applications. The entity may also analyze the issues to identify trends and profiles of common failure modes.

In some cases, an entity may identify a maintenance issue for a device and send an alert to the device so that the user may take an appropriate action. For example, data collected for a particular device may indicate that the text stream data indicates observations that are characteristic of a security event.

In some embodiments, the analytics engine may execute on a server. Text stream data may be collected and analyzed on the server. In other embodiments, the analytics engine may be cloud-based or otherwise implemented across multiple servers.

The text stream data collection functionality that is implemented by the analytic engine may be configurable. The text stream data collection rates and data collection types may be configured by appropriate interfaces such as an application programming interface or some other control mechanism for configuring the analytic engine. The data may be collected for defined time periods, or on a continuous basis or periodic basis.

In some embodiments, the collected data may be analyzed to determine statistical information. Furthermore, data mining may be performed to identify trends and patterns related to function, health, and performance. In one embodiment, the analytics engine may include a rate detection vector engine. The detection vector engine may incorporate a Naive Bayes classifier, fuzzy logic, and other methods. The detection vector engine may be configured to determine which data patterns are relevant for error analysis.

The analytics engine may allow the stored data to be accessible via a web site, or may allow the data to be accessible to users via a cloud-based system. The analytics engine may also allow device support and operations services to access the data via the website or through a side channel. The device support and operations services can therefore access the identified issues and supporting data to provide appropriate and timely services to users. For example, design and quality assurance personnel can access the data to make improvements to the design and production processes.

Figure 2:
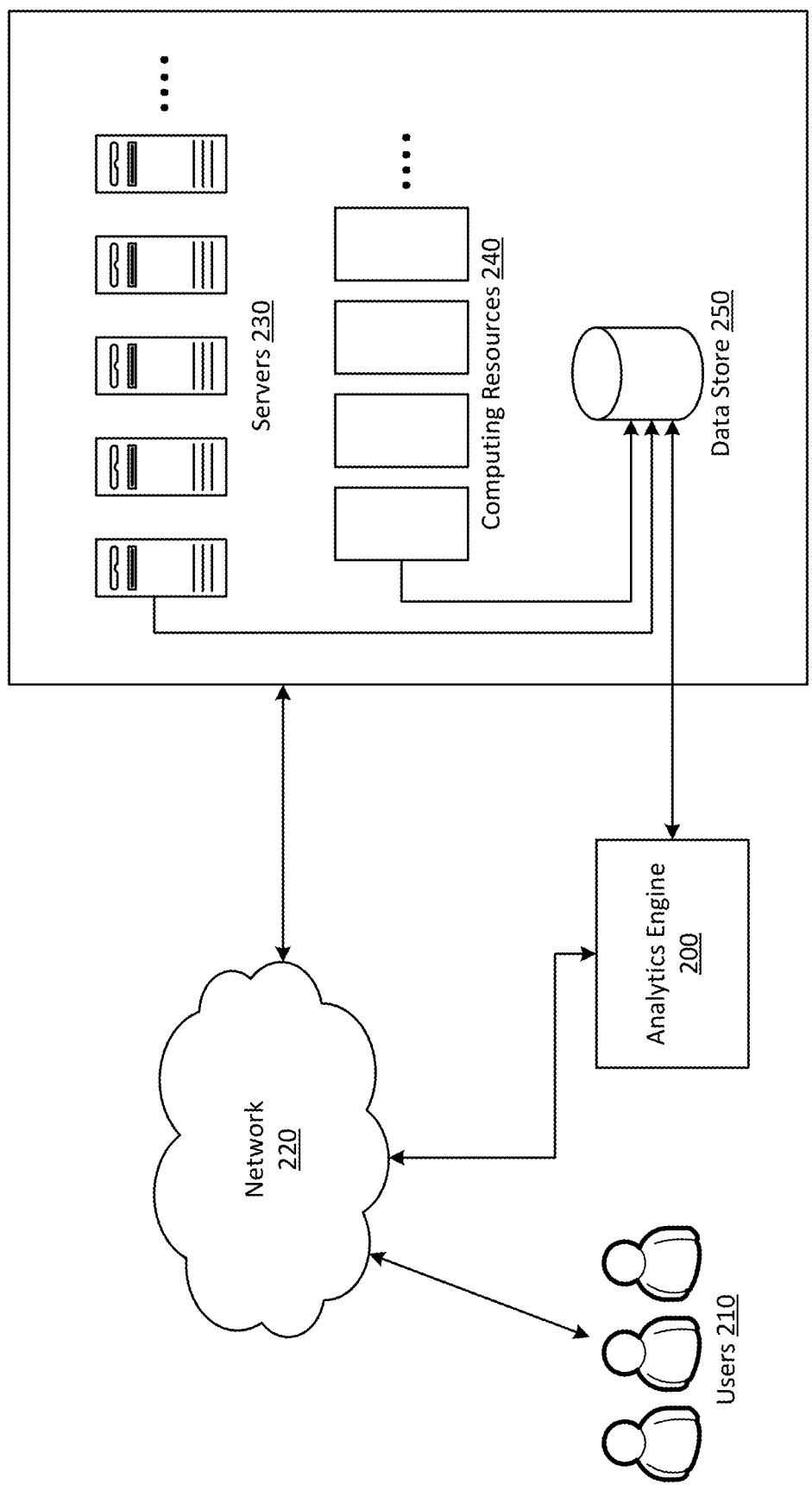
FIG. 2 is a diagram illustrating an analytics engine for identifying issues.

FIG. 2 is a diagram illustrating an analytics engine 200 for identifying issues in accordance with the present disclosure. In FIG. 2, an off-device service may include resources and applications that may execute, for example, on one or more servers 230. It will be appreciated that some embodiments may involve additional computing resources 240 of various types that may be provided.

FIG. 2 also illustrates a network 220 that may provide communications for one or more computers accessible by users 210. According to one embodiment, resources executing on servers 230 may be configured to provide support services to users 210 via network 220. FIG. 2 also illustrates a data store 220 that may store data pertaining to various events and metrics for devices of users 210.

A request may be sent to analytics engine 200 for analyzing one or more text stream sources. The analytics engine 200 may be co-hosted with the servers 230 and data store 220, or a combination thereof. In some embodiments, a request may be received from a device of one of the users 210 for analytics services. In other embodiments, the request may be received from one or more services at the device manufacturer or an application provider. In response to receipt of the request, analytics engine 200 may log the request and provide updates as to the status of the request. The analytics engine 200 may communicate with other services to facilitate: (1) processing of the request, (2) collection of data pertaining to request, and (2) generating interfaces to provide results of the request. The analytics engine 200 may, for example, provide an interface for facilitating submission of the request. The analytics engine 200 may further provide an interface for viewing the results of the request and modifying or cancelling the request. The analytics engine 200 may be made accessible via an application programming interface (API) or a user interface that may be accessed via a Web browser or other input mechanisms.

In some embodiments, the analytics engine 200 may monitor text stream sources automatically. For example, the analytics engine 200 may monitor a number of pre-selected text stream sources collected or determined at a predetermined frequency.

Additionally, the analytics engine 200 may provide users with the ability to request and receive notifications or to take specified actions depending on the identified issue. In some embodiments, the text stream data and issue data may be retained for a predetermined time to allow users to retrieve text stream source data for review and analysis. A user interface may be provided to allow access to the analytics engine 200. In some embodiments, a time frame for the issue detection may be specified as well as the resources to be evaluated. For example, a user may want to identify issues based only on user feedback.

The analytics engine 200 may provide a detailed analysis and summary of results to a requesting user. In some embodiments, an API may be provided to facilitate requests for issue information. For example, an API can be called with information such as a device or application identifier and specified issue. The API may be configured to receive electronic messages that encode identifiers indicative of a text stream analysis request for fulfillment by the analytics engine 200. In response to receiving one of the electronic messages, the API may send second electronic messages indicative of information indicating that text stream analysis request has been received and may provide the results of the text stream analysis.

Figure 3:
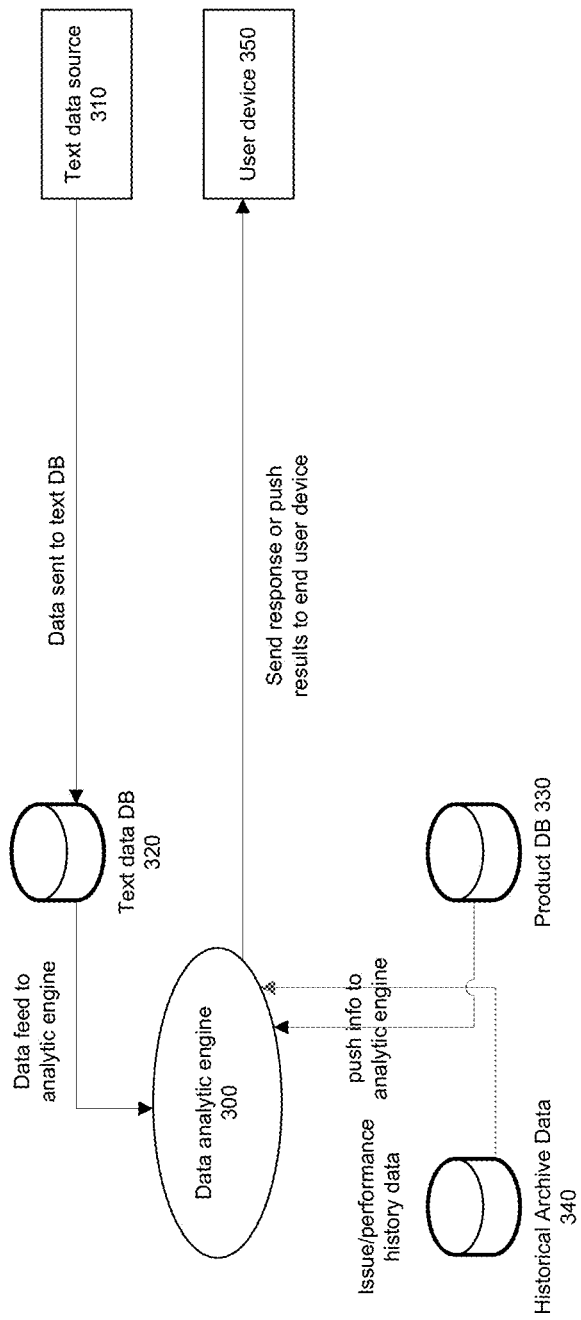
FIG. 3 is an example cloud-based analytic engine using multiple data sources.

FIG. 3 illustrates an example cloud-based analytic engine 300 using multiple data sources to identify issues and generate reports and/or recommendations to a user device. The data sources may include text stream data sent to a text database 320 from text data source 310, product data 330, and historical archive data 340. The illustrated cloud-based processing may enable issue identification. The text source data 310, product information 330, and corresponding issue history 340 may be used by the analytic engine 300 to identify issues and generate reports and/or recommendations. The reports and/or recommendations may be send to the user device 350.

Figure 4:
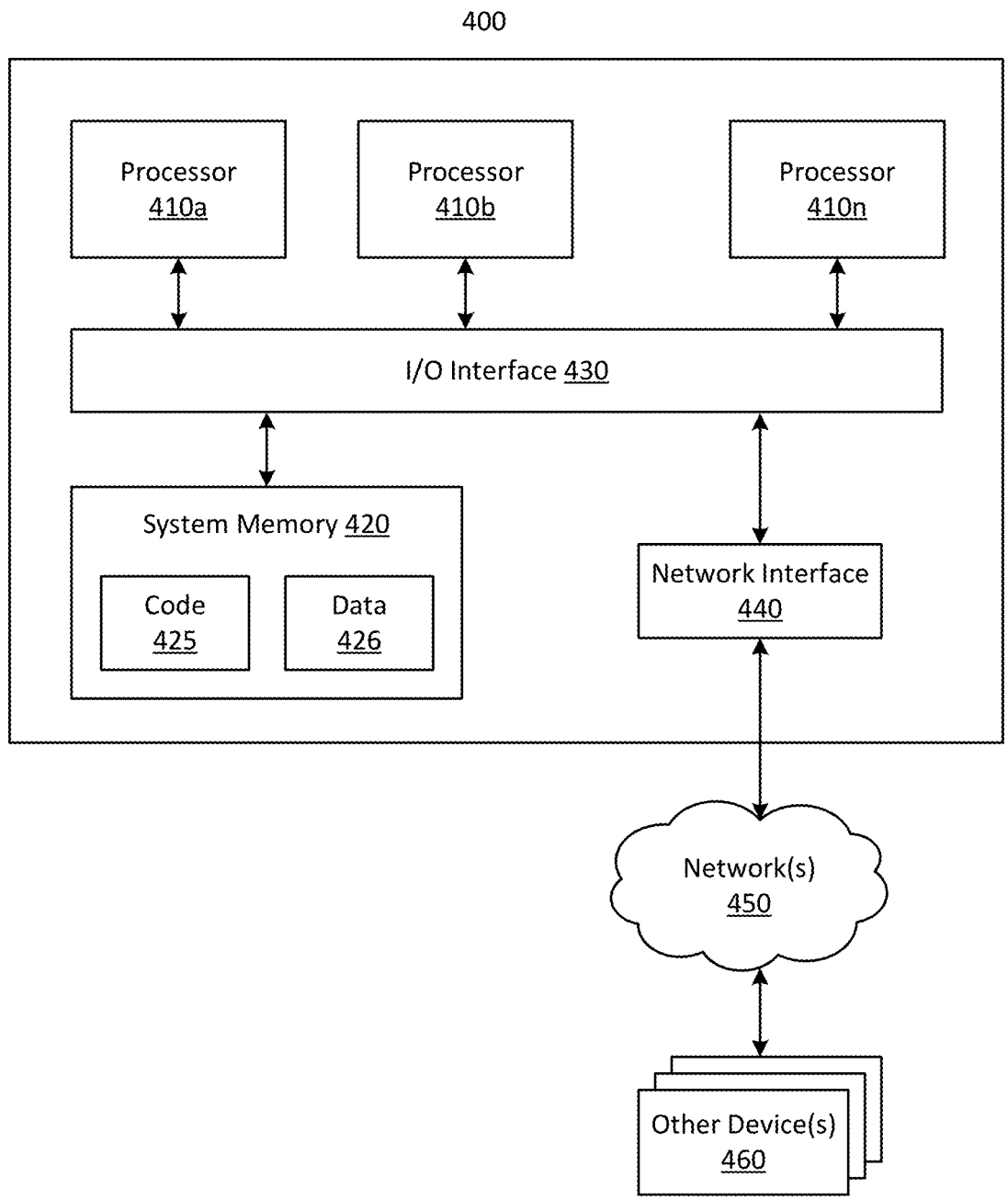
FIG. 4 is an example computer system that may be used in some embodiments.

In at least some embodiments, a computing device that implements a portion or all of one or more of the technologies described herein, including the techniques to implement the functionality of analytics engine 300 may include a general-purpose computer system that includes or is configured to access one or more computer-accessible media. FIG. 4 illustrates such a general-purpose computing device 400. In the illustrated embodiment, computing device 400 includes one or more processors 410a, 410b, and/or 410n (which may be referred herein singularly as "a processor 410" or in the plural as "the processors 410") coupled to a system memory 420 via an input/output (I/O) interface 430. Computing device 400 further includes a network interface 440 coupled to I/O interface 430.

In various embodiments, computing device 400 may be a uniprocessor system including one processor 410 or a multiprocessor system including several processors 410 (e.g., two, four, eight, or another suitable number). Processors 410 may be any suitable processors capable of executing instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be configured to store instructions and data accessible by processor(s) 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 420 as code 425 and data 426.

In one embodiment, I/O interface 430 may be configured to coordinate I/O traffic between processor 410, system memory 420, and any peripheral devices in the device, including network interface 440 or other peripheral interfaces. In some embodiments, I/O interface 430 may perform any necessary protocol, timing, or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computing device 400 and other device or devices 460 attached to a network or network(s) 450, such as other computer systems or devices as illustrated in FIGS. 1 through 11, for example. In various embodiments, network interface 440 may support communication via any suitable wired or wireless general data networks, such as types of Ethernet networks, for example. Additionally, network interface 440 may support communication via telecommunications/telephony networks such as analog voice networks or digital fiber communications networks, via storage area networks such as Fibre Channel SANs or via any other suitable type of network and/or protocol.

In some embodiments, system memory 420 may be one embodiment of a computer-accessible medium configured to store program instructions and data as described above for FIGS. 1-11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 400 via I/O interface 430. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 400 as system memory 420 or another type of memory. Further, a computer-accessible medium may include transmission media or signals such as electrical, electromagnetic or digital signals, conveyed via a communication medium such as a network and/or a wireless link, such as may be implemented via network interface 440. Portions or all of multiple computing devices, such as those illustrated in FIG. 4, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtualized computer servers, storage devices, networking equipment, and the like, needed to implement and distribute the infrastructure and services offered by the service provider.

A number of different types of computing devices may be used singly or in combination to implement the resources of the service provider in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Figure 5:
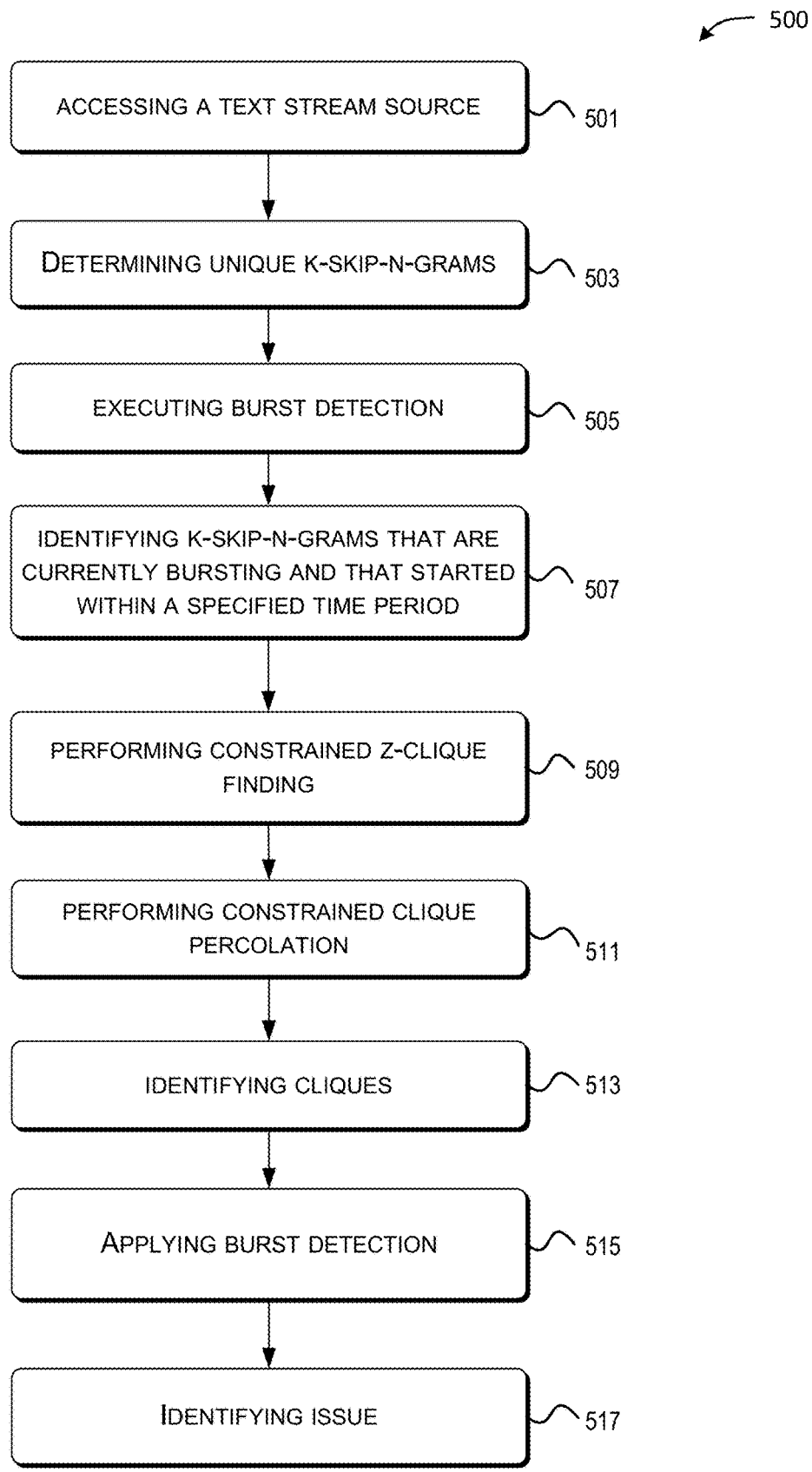
FIG. 5 illustrates aspects of a routine for enabling aspects of the techniques disclosed herein as shown and described below.

FIG. 5 illustrates aspects of a routine 500 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 5 can be performed, for example, by the computing device 400 of FIG. 4, as described above with respect to any one of FIGS. 1-3.

At operation 501, a text stream source comprising a plurality of entries is accessed. In some embodiments, the plurality of entries pertains to a computing product or service.

At operation 503, for the plurality of entries, unique k-skip-n-grams are determined. In some embodiments, the determined unique k-skip-n-grams are aggregated. In some embodiments, n=2 for the k-skip-n-grams.

At operation 505, a burst detection algorithm is executed to determine a burst level, burst start time, and burst end time of the k-skip-n-grams. In some embodiments, the burst detection algorithm is Kleinberg's Burst Detection Algorithm.

At operation 507, based on the burst level, burst start time, and burst end time, k-skip-n-grams that are currently bursting and that started within a specified time period are identified. In some embodiments, the specified time period comprises a dynamic monitoring period.

At operation 509, constrained z-clique finding on a graph of the identified k-skip-n-grams is performed. In some embodiments, the graph comprises pairs of vertices connected by an edge that represents one of the k-skip-n-gram. In some embodiments, the constrained z-clique is performed with z=3.

At operation 511, constrained clique percolation on the graph is performed.

At operation 513, cliques where a set of texts have all words included therein are identified.

At operation 515, the burst detection algorithm is applied over times at which feedback has occurred.

At operation 517, based on determined burst detections, an issue where there is no overlap of cliques is identified. In some embodiments, the issue comprises a potential service issue with the computing product or service. In some embodiments, cliques are eliminated where edges on the graph have a range of burst start time more than a predetermined amount of time.

Figure 6:
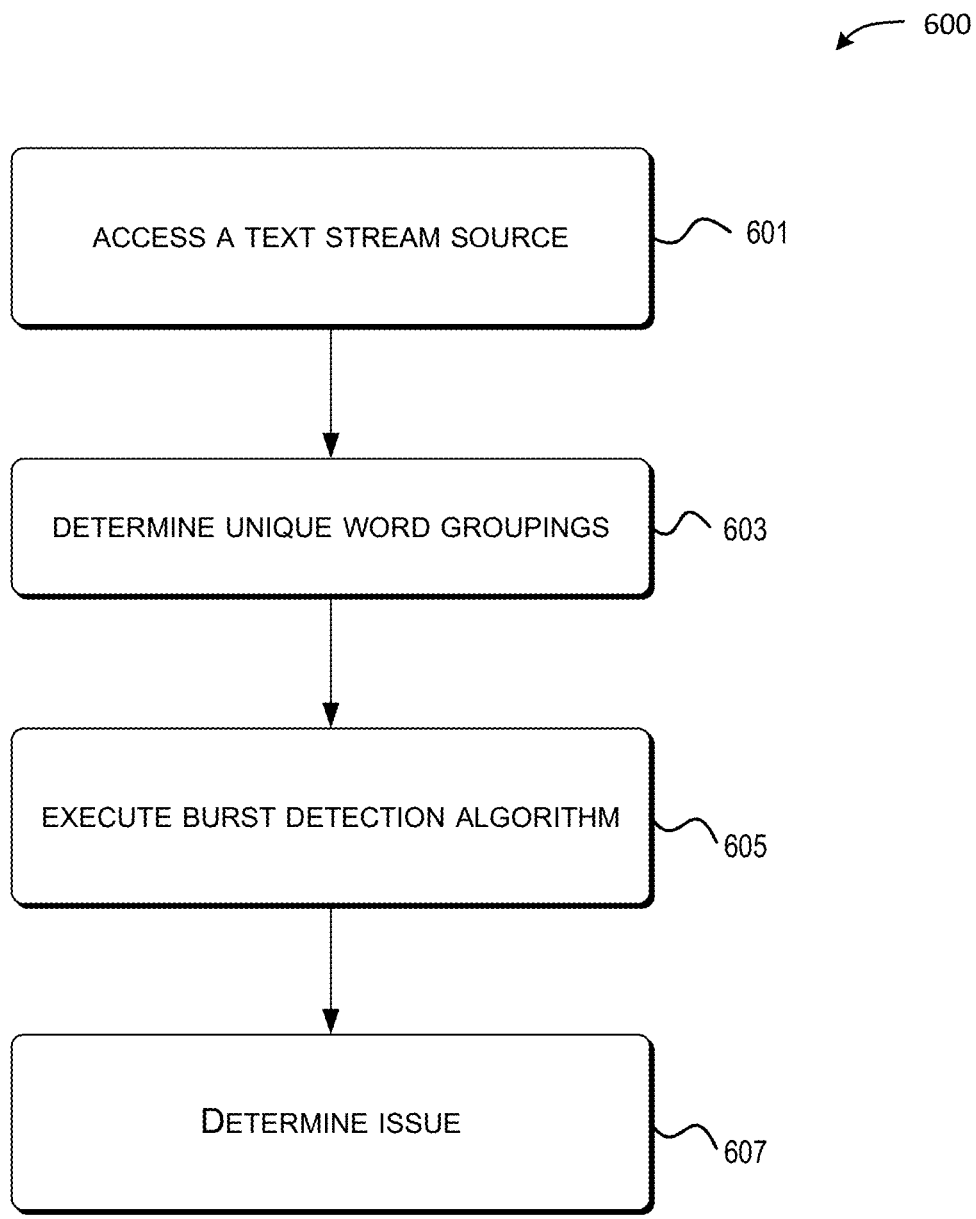
FIG. 6 illustrates aspects of a routine for enabling aspects of the techniques disclosed herein as shown and described below.

FIG. 6 illustrates aspects of a routine 600 for enabling aspects of the techniques disclosed herein as shown and described below. The operations in FIG. 6 can be performed, for example, by the computing device 400 of FIG. 4, as described above with respect to any one of FIGS. 1-3.

At operation 601, a text stream source comprising a plurality of text content items is accessed.

At operation 603, for the plurality of text content items, unique word groupings are determined. In an embodiment, the unique word groupings are determined as unique k-skip-n-grams. In an embodiment, unique word groupings are identified that are currently bursting and that started within a specified time period.

At operation 605, a burst detection algorithm is executed to determine word groupings that are currently bursting and that started within a specified time period. In an embodiment, constrained z-clique is performed finding for graphs where pairs of vertices connected by an edge represents one of the unique word groupings. In an embodiment, constrained clique percolation across graphs is performed.

At operation 607, based on the word groupings, an issue based on identifying a set of texts forming at least one clique is determined. In an embodiment, determining the issue comprises finding a set of texts that have at least all words therein in at least one clique and applying the burst detection algorithm over times at which feedback has occurred.

The disclosure presented herein may be considered in view of the following clauses.

A device comprising:
one or more processors;
a memory in communication with the one or more processors, the memory having computer-readable instructions stored thereupon which, when executed by the one or more processors, cause the device to:
  access a text stream source comprising a plurality of entries pertaining to a computing product or service;
  determining, for the plurality of entries, unique k-skip-n-grams;
  aggregating the determined k-skip-n-grams;
  executing a burst detection algorithm to determine Burst Level (BL), Burst Start Time (BST) and the Burst End Time (BET) of the k-skip-n-grams;
  identifying k-skip-n-grams that are currently bursting and that started within a specified time period;
  generating a graph where pairs of vertices connected by an edge represents one of the k-skip-n-grams;
  performing constrained z-clique finding across graphs;
  performing constrained clique percolation across graphs;
  finding a set of texts that have at least all the words in at least one clique;
  applying the burst detection algorithm over times at which feedback has occurred; and
  identifying an issue where there is no overlap of cliques.

A method comprising:
accessing a text stream source comprising a plurality of text content items;
determining, for the plurality of text content items, unique word groupings;
executing a burst detection algorithm to determine word groupings that are currently bursting and that started within a specified time period; and
based on the word groupings, determining an issue based on identifying a set of texts forming at least one clique.

The disclosure presented herein may also be considered in view of the following example clauses.

Example Clause A, a device comprising:
one or more processors;
a memory in communication with the one or more processors, the memory having computer-readable instructions stored thereupon which, when executed by the one or more processors, cause the device to perform operations comprising:
  accessing a text stream source comprising a plurality of entries;
  determining, for the plurality of entries, unique k-skip-n-grams;
  executing a burst detection algorithm to determine a burst level, burst start time, and burst end time of the k-skip-n-grams;
  based on the burst level, burst start time, and burst end time, identifying k-skip-n-grams that are currently bursting and that started within a specified time period;
  performing constrained z-clique finding on a graph of the identified k-skip-n-grams;
  performing constrained clique percolation on the graph;
  identifying cliques where a set of texts have all words included therein;
  applying the burst detection algorithm over times at which feedback has occurred; and
  based on determined burst detections, identifying an issue where there is no overlap of cliques.

Example Clause B, the device of Example Clause A, wherein the plurality of entries pertains to a computing product or service.

Example Clause C, the device of Example Clause B, further comprising computer-readable instructions stored thereupon which, when executed by the one or more processors, cause the device to perform operations comprising: aggregating the determined unique k-skip-n-grams prior to executing the burst detection algorithm to determine the burst level, burst start time, burst end time of the k-skip-n-grams.

Example Clause D, the device of any one of Example Clauses A through C, wherein the graph comprises pairs of vertices connected by an edge that represents one of the k-skip-n-grams.

Example Clause E, the device of any one of Example Clauses A through D, wherein the issue comprises a potential service issue with the computing product or service.

Example Clause F, the device of any one of Example Clauses A through D, wherein the specified time period comprises a dynamic monitoring period.

Example Clause G, the device of any one of Example Clauses A through F, wherein n=2 for the k-skip-n-grams.

Example Clause H, the device of any one of Example Clauses A through G, wherein the burst detection algorithm is Kleinberg's Burst Detection Algorithm.

Example Clause I, the device of any one of Example Clauses A through G, wherein the constrained z-clique is performed with z=3.

Example Clause J, the device of any one of Example Clauses A through I, wherein cliques are eliminated where edges on the graph have a range of burst start time more than a predetermined amount of time.

Example Clause K, the device of any one of Example Clauses A through J, wherein the constrained clique percolation is performed with two z-cliques being considered adjacent if they share z−1 nodes and a range of the burst start time of a combined set of edges is less a predetermined amount of time.

While Example Clauses A through K are described above with respect to a device, it is understood in the context of this disclosure that the subject matter of Example Clauses A through L can additionally or alternatively be implemented as a method, system, or via computer readable storage media.

Example Clause L, a computing device comprising:
one or more processors;
a memory in communication with the one or more processors, the memory having computer-readable instructions stored thereupon which, when executed by the one or more processors, cause the computing device to:
  access a text stream source comprising a plurality of text content items;
  determine, for the plurality of text content items, unique word groupings;
  execute a burst detection algorithm to determine word groupings that are currently bursting and that started within a specified time period; and
  based on the word groupings, determine an issue based on identifying a set of texts forming at least one clique.

Example Clause M, the computing device of Example Clause L, wherein the unique word groupings are determined as unique k-skip-n-grams.

Example Clause N, the computing device of Example Clause L or Example Clause M, further comprising computer-readable instructions stored thereupon which, when executed by the one or more processors, cause the device to identify unique word groupings that are currently bursting and that started within a specified time period.

Example Clause O, the computing device of Example Clauses L through Example Clause N, further comprising computer-readable instructions stored thereupon which, when executed by the one or more processors, cause the device to perform constrained z-clique finding for graphs where pairs of vertices connected by an edge represents one of the unique word groupings.

Example Clause P, the computing device of Example Clauses L through Example Clause O, further comprising computer-readable instructions stored thereupon which, when executed by the one or more processors, cause the device to perform constrained z-clique finding across graphs.

Example Clause Q, the computing device of Example Clauses L through Example Clause P, further comprising computer-readable instructions stored thereupon which, when executed by the one or more processors, cause the device to perform constrained clique percolation across graphs.

Example Clause R, the computing device of Example Clauses L through Example Clause Q, wherein determining the issue comprises finding a set of texts that have at least all words therein in at least one clique and applying the burst detection algorithm over times at which feedback has occurred.

While Example Clauses L through R are described above with respect to a computing device, it is understood in the context of this disclosure that the subject matter of Example Clauses L through R can additionally or alternatively be implemented by a method or via computer readable storage media.

Example Clause S, a computer-implemented method, comprising analyzing text data to determine a plurality of unique k-skip-n-grams; and executing a burst detection algorithm and clique finding on the unique k-skip-n-grams to identify a statistically significant pattern in the text data.

Example Clause T, the device of Example Clause S, wherein the unique k-skip-n-grams are determined based at least in part on k-skip-n-grams that are currently bursting and that started within a specified time period.

While Example Clauses S through T are described above with respect to a method, it is understood in the context of this disclosure that the subject matter of Example Clauses S through T can additionally or alternatively be implemented as a device or via computer readable storage media.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A device comprising:
   one or more processors;
   a memory in communication with the one or more processors, the memory having computer-readable instructions stored thereupon which, when executed by the one or more processors, cause the device to perform operations comprising:
   accessing a text stream source comprising a plurality of entries;
   determining, for the plurality of entries, unique k-skip-n-grams;
   executing a burst detection algorithm to determine a burst level, burst start time, and burst end time of the k-skip-n-grams;
   based on the burst level, burst start time, and burst end time, identifying k-skip-n-grams that are currently bursting and that started within a specified time period;
   based on a graph of the identified k-skip-n-grams, identifying cliques where a set of texts have all words included therein;
   applying the burst detection algorithm over times at which feedback has occurred; and
   based on determined burst detections, identifying an issue where there is no overlap of cliques.

2. The device of claim 1, wherein the cliques are identified by performing constrained z-clique finding and constrained clique percolation on the graph of the identified k-skip-n-grams.

3. The device of claim 1, further comprising computer-readable instructions stored thereupon which, when executed by the one or more processors, cause the device to perform operations comprising: aggregating the determined unique k-skip-n-grams prior to executing the burst detection algorithm to determine the burst level, burst start time, burst end time of the k-skip-n-grams.

4. The device of claim 1, wherein the graph comprises pairs of vertices connected by an edge that represents one of the k-skip-n-grams.

5. The device of claim 1, wherein the plurality of entries pertains to a computing product or service and the issue comprises a potential service issue with the computing product or service.

6. The device of claim 1, wherein the specified time period comprises a dynamic monitoring period.

7. The device of claim 1, wherein n=2 for the k-skip-n-grams.

8. The device of claim 1, wherein the burst detection algorithm is Kleinberg's Burst Detection Algorithm.

9. The device of claim 2, wherein the constrained z-clique is performed with z=3.

10. The device of claim 1, wherein cliques are eliminated where edges on the graph have a range of burst start time more than a predetermined amount of time.

11. The device of claim 2, wherein the constrained clique percolation is performed with two z-cliques being considered adjacent if they share z−1 nodes and a range of the burst start time of a combined set of edges is less than a predetermined amount of time.

12. A computer-implemented method, comprising:
   accessing a text stream source comprising a plurality of entries;
   determining, for the plurality of entries, unique k-skip-n-grams;
   executing a burst detection algorithm to determine a burst level, burst start time, and burst end time of the k-skip-n-grams;
   based on the burst level, burst start time, and burst end time, identifying k-skip-n-grams that are currently bursting and that started within a specified time period;
   identifying cliques where a set of texts have all words included therein;
   applying the burst detection algorithm over times at which feedback has occurred; and
   based on determined burst detections, identifying an issue where there is no overlap of cliques.

13. The method of claim 12, wherein the cliques are identified by performing constrained z-clique finding and constrained clique percolation on a graph of the identified k-skip-n-grams.

14. The method of claim 12, further comprising aggregating the determined unique k-skip-n-grams prior to executing the burst detection algorithm to determine the burst level, burst start time, burst end time of the k-skip-n-grams.

15. The method of claim 13, wherein the graph comprises pairs of vertices connected by an edge that represents one of the k-skip-n-grams.

16. The method of claim 13, wherein n=2 for the k-skip-n-grams and the constrained z-clique is performed with z=3.

17. The method of claim 12, wherein the burst detection algorithm is Kleinberg's Burst Detection Algorithm.

18. The method of claim 13, wherein cliques are eliminated where edges on the graph have a range of burst start time more than a predetermined amount of time.

19. The method of claim 13, wherein the constrained clique percolation is performed with two z-cliques being considered adjacent if they share z−1 nodes and a range of the burst start time of a combined set of edges is less than a predetermined amount of time.

20. A computer-readable storage medium having computer-executable instructions stored thereupon which, when executed by one or more processors of a computing device, cause the computing device to perform operations comprising:
   accessing a text stream source comprising a plurality of entries;
   determining, for the plurality of entries, unique k-skip-n-grams;
   executing a burst detection algorithm to determine a burst level, burst start time, and burst end time of the k-skip-n-grams;
   based on the burst level, burst start time, and burst end time, identifying k-skip-n-grams that are currently bursting and that started within a specified time period;
   based on a graph of the identified k-skip-n-grams, identifying cliques where a set of texts have all words included therein;

applying the burst detection algorithm over times at which feedback has occurred; and based on determined burst detections, identifying an issue where there is no overlap of cliques.

* * * * *